United States Patent
Park et al.

(10) Patent No.: US 9,888,407 B2
(45) Date of Patent: Feb. 6, 2018

(54) METHODS AND ARRANGEMENTS FOR TRAFFIC INDICATION MAPPING IN WIRELESS NETWORKS

(75) Inventors: Minyoung Park, Portland, OR (US); Thomas J. Kenney, Portland, OR (US); Emily H. Qi, Portland, OR (US); Thomas A. Tetzlaff, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/977,706

(22) PCT Filed: Dec. 31, 2011

(86) PCT No.: PCT/US2011/068259
§ 371 (c)(1),
(2), (4) Date: Mar. 19, 2014

(87) PCT Pub. No.: WO2013/066363
PCT Pub. Date: May 10, 2013

(65) Prior Publication Data
US 2015/0029933 A1  Jan. 29, 2015

Related U.S. Application Data

(60) Provisional application No. 61/554,027, filed on Nov. 1, 2011.

(51) Int. Cl.
*H04W 28/06* (2009.01)
*H04L 1/00* (2006.01)
(Continued)

(52) U.S. Cl.
CPC ......... *H04W 28/065* (2013.01); *H04L 1/0079* (2013.01); *H04W 68/005* (2013.01); *H04W 28/06* (2013.01); *H04W 72/1289* (2013.01)

(58) Field of Classification Search
CPC . H04W 28/00; H04W 28/02; H04W 28/0252; H04W 28/0263; H04W 28/06; H04W 28/065
See application file for complete search history.

(56) References Cited

U.S. PATENT DOCUMENTS

2007/0258356 A1  11/2007  Joung et al.
2009/0016306 A1  1/2009  Wang et al.
(Continued)

FOREIGN PATENT DOCUMENTS

CN  101674530 A  3/2010
CN  101909347 A  12/2010
(Continued)

OTHER PUBLICATIONS

"International Application Serial No. PCT/US2011/068259, International Preliminary Report on Patentability dated May 15, 2014", 6 pgs.

(Continued)

*Primary Examiner* — Feben M Haile
(74) *Attorney, Agent, or Firm* — Schwegman Lundberg & Woessner, P.A.

(57) ABSTRACT

Embodiments may implement a new hierarchical data structure for traffic indication mapping to facilitate transmissions for wireless communications devices. Many embodiments comprise MAC sublayer logic to generate and transmit management frames such as beacon frames with a partial virtual bitmap based upon the hierarchical data structure for traffic indication mapping. In some embodiments, the MAC sublayer logic may store the traffic indication map and/or the traffic indication map structure in memory, in logic, or in another manner that facilitates transmission of the frames. Some embodiments may receive, detect, and decode communications with frames comprising the partial virtual bitmap based upon the hierarchical data structure. In some (Continued)

embodiments, indications of buffered data for pages, blocks, sub-blocks, and/or stations may be inverted. In several embodiments, a new association identifier (AID) structure is defined for the new hierarchical data structure for traffic indication mapping.

15 Claims, 7 Drawing Sheets

(51) Int. Cl.
*H04W 68/00* (2009.01)
*H04W 72/12* (2009.01)

(56) References Cited

U.S. PATENT DOCUMENTS

| | | | |
|---|---|---|---|
| 2009/0291638 A1 | 11/2009 | Sugaya et al. | |
| 2010/0110962 A1 | 5/2010 | Igarashi et al. | |
| 2010/0142426 A1 | 6/2010 | Taniuchi et al. | |
| 2010/0265864 A1 | 10/2010 | He et al. | |
| 2010/0309831 A1 | 12/2010 | Yeh et al. | |
| 2011/0200059 A1* | 8/2011 | Tavallaei | H04L 25/49 370/476 |
| 2013/0223210 A1* | 8/2013 | Asterjadhi | H04L 1/0025 370/230 |
| 2013/0229959 A1* | 9/2013 | Ghosh et al. | 370/311 |
| 2013/0294261 A1* | 11/2013 | Ghosh et al. | 370/252 |
| 2014/0112355 A1* | 4/2014 | Fang | H04L 69/04 370/477 |
| 2014/0146678 A1* | 5/2014 | Merlin | H04L 47/12 370/235 |
| 2014/0334368 A1* | 11/2014 | Zhou | H04W 4/08 370/311 |
| 2015/0030036 A1* | 1/2015 | Wang | H04L 69/04 370/477 |
| 2015/0085780 A1* | 3/2015 | Kim | H04W 52/0216 370/329 |
| 2015/0146597 A1* | 5/2015 | Jeong | H04B 7/26 370/311 |
| 2015/0181452 A1* | 6/2015 | Jafarian | H04W 8/18 370/338 |
| 2015/0230244 A1* | 8/2015 | Choi | H04L 1/1614 370/329 |

FOREIGN PATENT DOCUMENTS

| | | |
|---|---|---|
| CN | 104115462 A | 10/2014 |
| CN | 106411460 A | 2/2017 |
| WO | WO-2013066363 A1 | 5/2013 |

OTHER PUBLICATIONS

"International Application Serial PCT/US2011/068259, International Search Report dated Nov. 29, 2012", 3 pgs.

"International Application Serial No. PCT/US2011/068259, Written Opinion dated Nov. 29, 2012", 4 pgs.

"Chinese Application Serial No. 201180075258.2, Office Action dated Apr. 22, 2016", w/ English Translation, 13 pgs.

"Chinese Application Serial No. 201180075258.2, Office Action dated Dec. 16, 2016", w/ English Translation, 6 pgs.

"Chinese Application Serial No. 201180075258.2, Response filed Sep. 6, 2016 to Office Action dated Apr. 22, 2016", With English Translation of Claims, 18 pgs.

"Chinese Application Serial No. 201180075258.2, Office Action dated Apr. 25, 2017", w/English Translation, 7 pgs.

"Chinese Application Serial No. 201180075258.2, Response filed Feb. 27, 2017 to Office Action dated Dec. 16, 2016", w/ claims in English, 11 pgs.

"Chinese Application Serial No. 201180075258.2, Office Action dated Sep. 15, 2017", w/English Translation, 8 pgs.

"Chinese Application Serial No. 201180075258.2, Response filed Jul. 7, 2017 to Office Action dated Apr. 24, 2017", w/ claims in English, 32 pgs.

* cited by examiner

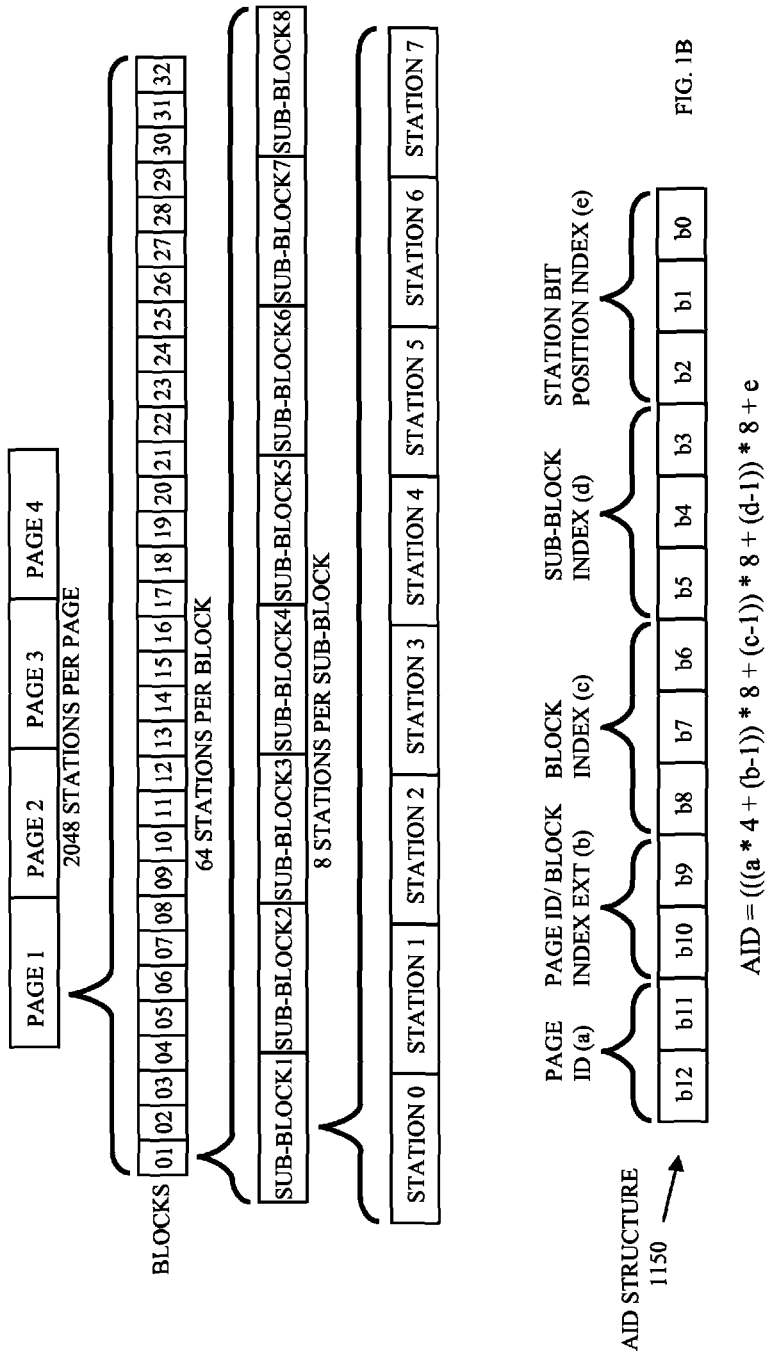

METHODS AND ARRANGEMENTS FOR TRAFFIC INDICATION MAPPING IN WIRELESS NETWORKS

BACKGROUND

Embodiments are in the field of wireless communications. More particularly, embodiments are in the field of communications protocols between wireless transmitters and receivers.

BRIEF DESCRIPTION OF THE DRAWINGS

FIG. 1A depicts an embodiment of a hierarchical data structure for traffic indication mapping;

FIG. 1B depicts an embodiment of an association identifier structure for the hierarchical data structure illustrated in FIG. 1A;

DETAILED DESCRIPTION OF EMBODIMENTS

Figure 1:
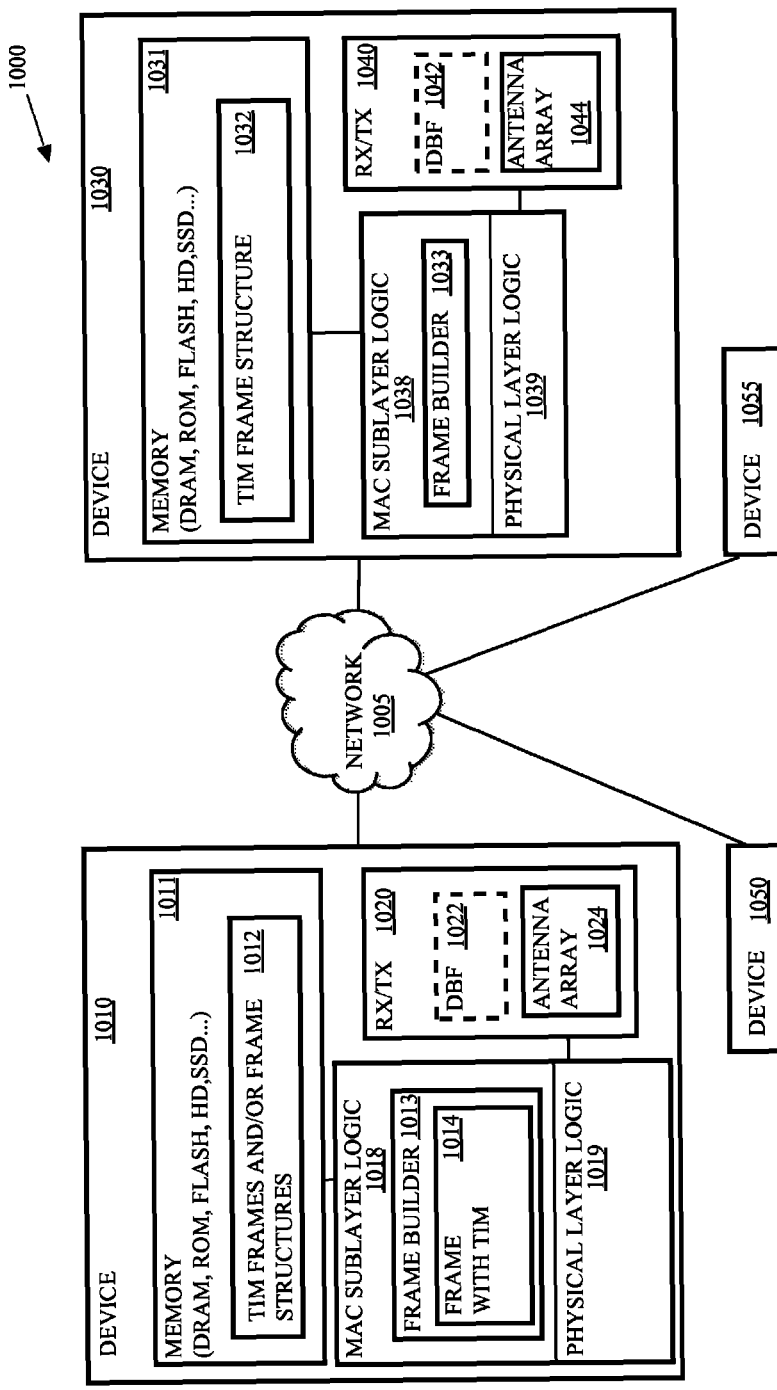
FIG. 1 depicts an embodiment of a wireless network comprising a plurality of communications devices, including multiple fixed or mobile communications devices.

The following is a detailed description of novel embodiments depicted in the accompanying drawings. However, the amount of detail offered is not intended to limit anticipated variations of the described embodiments; on the contrary, the claims and detailed description are to cover all modifications, equivalents, and alternatives falling within the spirit and scope of the present teachings as defined by the appended claims. The detailed descriptions below are designed to make such embodiments understandable to a person having ordinary skill in the art.

References to "one embodiment," "an embodiment," "example embodiment," "various embodiments," etc., indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Embodiments may implement a new hierarchical data structure for traffic indication mapping to facilitate transmissions for wireless communications devices. Many embodiments comprise MAC sublayer logic to generate and transmit management frames such as beacon frames with a partial virtual bitmap based upon the hierarchical data structure for traffic indication mapping. In some embodiments, the MAC sublayer logic may store the traffic indication map and/or the traffic indication map structure in memory, in logic, or in another manner that facilitates transmission of the frames. Some embodiments may receive, detect, and decode communications with frames comprising the partial virtual bitmap based upon the hierarchical data structure.

In many embodiments, the new hierarchical data structure for traffic indication mapping may describe stations assigned to a sub-block, more than one sub-blocks of stations assigned to a blocks, and more than one blocks of stations assigned to a page of more than one pages of stations. In one embodiment, the new hierarchical data structure for traffic indication mapping comprises four pages to facilitate mapping for up to 2048 stations per page. In such embodiments, each page may comprise 32 blocks with unique subsets of the stations assigned to the page, each block may comprise eight sub-blocks of unique subsets of the stations assigned to the block, and each sub-block may comprise a unique subset of eight stations. Furthermore, the partial virtual bitmaps that refer to such structures may identify the association identifiers for stations for which data is being buffered by an access point (AP) by identifying the corresponding page(s), block(s), and sub-blocks within which the stations reside. In many embodiments, the AP may determine and transmit such an association identifier to each station as the stations are associated with the AP.

In many embodiments, the AP may compress and/or reduce the amount of data in the partial virtual bitmap of the traffic indication map (TIM) element. In some embodiments, the amount of data may be reduce/compressed by referencing sub-blocks in a block bitmap and including or excluding the sub-blocks within the partial virtual bitmap based upon the content of the sub-blocks. In some embodiments, the amount of data may be reduce/compressed by limiting the range of blocks within the partial virtual bitmap based upon the page to which the blocks are assigned and/or the block indexes. For instance, the partial virtual bitmap may indicate an ending block index within a page of blocks and/or may reference a starting block index within the page of blocks.

In several embodiments, the amount of data in the partial virtual bitmap of the TIM element may be reduce/compressed by encoding the content of the block. For instance, each block may include a block control field to describe an encoding scheme for the block. In several embodiments, the encoding scheme may comprise a block encoding in which blocks with all the same bit values such as all logical ones or all logical zeros may be identified in the block control field, making it unnecessary to include the content of the block in the partial virtual bitmap to convey the content of the block to an associated station.

In further embodiments, the encoding scheme may comprise sub-block encoding in which each sub-blocks comprises all the same bit values such as all logical ones or all logical zeros. In such embodiments, a block bitmap field may be included in the block to identify whether sub-blocks are all ones or all zeros by including a logical zero or a logical one in the block bitmap for each sub-block. The combination of the sub-block encoding and the block bitmap makes it unnecessary to further describe the content of the block in the partial virtual bitmap to convey such content to an associated station.

In many embodiments, the encoding scheme may comprise normal encoding in which the content of each sub-block of a block may be included or excluded depending upon the content of the sub-block. For instance, some blocks may only include sub-blocks that include at least one bit that is a logical one. Other blocks may be inverted and only include sub-blocks that include at least one bit that is a logical zero. In many embodiments, inverting such indications may compress the data transmitted in the TIM element. For instance, if the number of blocks that comprise all logical ones exceeds the number of blocks with all logical zeros, less data may be transmitted in the TIM element to describe the stations with all logical zeros. Thus, the indications of buffered data for the stations may be inverted by, e.g., selecting a normal encoding with inversion, allowing stations described in the TIM element to indicate that such stations do not have buffered data instead of including, in the TIM element, stations that do have buffered data.

In several embodiments, a new association identifier (AID) structure is defined for the new hierarchical data structure for traffic indication mapping. In many embodiments, the new AID structure comprises bits identifying a page, bits identifying a block, bits identifying a page or block extension, bits identifying a sub-block, and bits identifying a station within the particular sub-block. A station associated with an AP may parse the association identifier to determine the page, block, and, depending on the block encoding, the sub-block, and bit position within that sub-block of a TIM element that identifies whether the AP is buffering data for the station.

Some embodiments implement Institute of Electrical and Electronic Engineers (IEEE) 802.11 systems such as IEEE 802.11ah systems and other systems that operate in accordance with standards such as the IEEE 802.11-2007, IEEE Standard for Information technology—Telecommunications and information exchange between systems—Local and metropolitan area networks—Specific requirements—Part 11: Wireless LAN Medium Access Control (MAC) and Physical Layer (PHY) Specifications (http://standards.ieee-.org/getieee802/download/802.11-2007.pdf).

According to one embodiment, the partial virtual bitmap based upon the hierarchical data structure for traffic indication mapping is defined to enable a greater number of associated stations and to utilize a more efficient TIM element and, in many instances, smaller TIM element for low-power consumption stations such as small battery-powered wireless devices (e.g., sensors) to use Wi-Fi to connect to the Internet with very low power consumption. Supporting such a large number of stations becomes challenging especially when those associated stations are in a power save (PS) mode because a much larger TIM element may have to be transmitted to describe, in a partial virtual map, all stations between the block with the lowest station AID for which data is buffered to the block with the highest station AID. Since IEEE 802.11ah is expected to have a physical layer (PHY) data rate of 1/10 or lower compared to 802.11n PHY data rates, the overhead of TIM element transmission becomes much larger in terms of channel occupancy.

Several embodiments comprise access points (APs) for and/or client devices of APs or stations (STAs) such as routers, switches, servers, workstations, netbooks, mobile devices (Laptop, Smart Phone, Tablet, and the like), as well as sensors, meters, controls, instruments, monitors, appliances, and the like. Some embodiments may provide, e.g., indoor and/or outdoor "smart" grid and sensor services. For example, some embodiments may provide a metering station to collect data from sensors that meter the usage of electricity, water, gas, and/or other utilities for a home or homes within a particular area and wirelessly transmit the usage of these services to a meter substation. Further embodiments may collect data from sensors for home healthcare, clinics, or hospitals for monitoring healthcare related events and vital signs for patients such as fall detection, pill bottle monitoring, weight monitoring, sleep apnea, blood sugar levels, heart rhythms, and the like. Embodiments designed for such services may generally require much lower data rates and much lower (ultra low) power consumption than devices provided in IEEE 802.11n/ac systems.

Logic, modules, devices, and interfaces herein described may perform functions that may be implemented in hardware and/or code. Hardware and/or code may comprise software, firmware, microcode, processors, state machines, chipsets, or combinations thereof designed to accomplish the functionality.

Embodiments may facilitate wireless communications. Some embodiments may comprise low power wireless communications like Bluetooth®, wireless local area networks (WLANs), wireless metropolitan area networks (WMANs), wireless personal area networks (WPAN), cellular networks, communications in networks, messaging systems, and smart-devices to facilitate interaction between such devices. Furthermore, some wireless embodiments may incorporate a single antenna while other embodiments may employ multiple antennas. For instance, multiple-input and multiple-output (MIMO) is the use of radio channels carrying signals via multiple antennas at both the transmitter and receiver to improve communication performance.

While some of the specific embodiments described below will reference the embodiments with specific configurations, those of skill in the art will realize that embodiments of the present disclosure may advantageously be implemented with other configurations with similar issues or problems.

Turning now to FIG. 1, there is shown an embodiment of a wireless communication system 1000. The wireless communication system 1000 comprises a communications device 1010 that may be wire line and wirelessly connected to a network 1005. The communications device 1010 may communicate wirelessly with a plurality of communication devices 1030, 1050, and 1055 via the network 1005. The communications device 1010 may comprise an access point. The communications device 1030 may comprise a low power communications device such as a sensor, a consumer electronics device, a personal mobile device, or the like. And communications devices 1050 and 1055 may comprise sensors, stations, access points, hubs, switches, routers, computers, laptops, netbooks, cellular phones, smart phones, PDAs (Personal Digital Assistants), or other wireless-capable devices. Thus, communications devices may be mobile or fixed. For example, the communications device 1010 may comprise a metering substation for water consumption within a neighborhood of homes. Each of the homes within the neighborhood may comprise a sensor such as the communications device 1030 and the communications device 1030 may be integrated with or coupled to a water usage meter.

Initially, the communications device 1030 may associate with the communications device 1010 and receive an association identifier (AID) from the communications device 1010 to uniquely identify the communications device 1030 with respect to other communications devices associated with the communications device 1010. In many embodiments, the AID may comprise 13 bits, wherein the bits identify the page, block, sub-block, and a bit position for the station within the sub-block. FIG. 1B depicts an embodiment of such an AID structure 1150. Thereafter, the communications device 1010 may buffer data such as medium access control (MAC) service data units (MSDUs) for the communications device 1030.

After buffering an MSDU for the communications device 1030, the communications device 1010 may transmit a beacon to associated devices, identifying the devices with data buffered by the communications device 1010 by means of a traffic indication map (TIM) element such as the frame 1014. In the present embodiment, the TIM element may identify the AID of each station that has data buffered such as the communications device 1030 by identifying the page, the block, and, depending upon the encoding of the block, the sub-block of the stations. The TIM element may also comprise a number of bits such as eight bits that identify the stations in the sub-block that have buffered data via logical ones and zeroes. In many embodiments, a logical one at the bit location in the sub-block associated with the communications device 1030 may indicate that the communications device 1010 is buffering data for the communications device 1030. In further embodiments, a logical zero may represent that the communications device 1010 is buffering data for the communications device 1030.

The communications device 1030 may interpret the TIM element based upon the association identifier assigned to the communications device 1030 by the communications device 1010. In many embodiments, the communications device 1030 may parse the association identifier to determine a page associated with communications device 1030 and may parse the TIM element to determine if the TIM element describes data buffering for stations associated with the same page. If so, the communications device 1030 may parse the TIM element to determine if the TIM element describes data buffering for stations if the block index from the AID falls within the range of block indexes identified by a start block index and/or an end block index. If so, the communications device 1030 may repeat the process of parsing the association identifier and comparing the values of the block and sub-block with those represented by the TIM element to determine whether the TIM element indicates that the communications device 1010 is buffering data for the communications device 1030 and/or whether the TIM element includes data at the bit position in the sub-block associated with the communications device 1030 that indicates that the communications device 1010 is buffering data for the communications device 1030.

In further embodiments, the communications device 1010 may facilitate data offloading. For example, communications devices that are low power sensors may include a data offloading scheme to, e.g., communicate via Wi-Fi, another communications device, a cellular network, or the like for the purposes of reducing power consumption consumed in waiting for access to, e.g., a metering station and/or increasing availability of bandwidth. Communications devices that receive data from sensors such as metering stations may include a data offloading scheme to, e.g., communicate via Wi-Fi, another communications device, a cellular network, or the like for the purposes of reducing congestion of the network 1005.

The network 1005 may represent an interconnection of a number of networks. For instance, the network 1005 may couple with a wide area network such as the Internet or an intranet and may interconnect local devices wired or wirelessly interconnected via one or more hubs, routers, or switches. In the present embodiment, network 1005 communicatively couples communications devices 1010, 1030, 1050, and 1055.

The communication devices 1010 and 1030 comprise memory 1011 and 1031, medium access control (MAC) sublayer logic 1018 and 1038, and physical layer (PHY) logic 1019 and 1039, respectively. The memory 1011 and 1031 may comprise a storage medium such as dynamic random access memory (DRAM), read only memory (ROM), buffers, registers, cache, flash memory, hard disk drives, solid-state drives, or the like. The memory 1011 and 1031 may store frames and/or frame structures, or portions thereof such as a management frame structure and a traffic indication map (TIM) element based upon a hierarchical data structure such as the hierarchical data structure 1100 illustrated in FIG. 1A. Furthermore, the memory 1011 and 1031 may comprise a traffic indication map in a hierarchical data structure that identifies the associated stations for which data is buffered. For example, the memory 1011 may comprise an indication that the communications device 1010 comprises buffered data as well as a reference or link to the buffered data for the communications device 1030.

The MAC sublayer logic 1018, 1038 may comprise logic to implement functionality of the MAC sublayer of the data link layer of the communications device 1010, 1030. The MAC sublayer logic 1018, 1038 may generate the frames such as management frames and the physical layer logic 1019, 1039 may generate physical layer protocol data units (PPDUs) based upon the frames. For example, the frame builder 1013 may generate frames with a TIM element 1014 and the data unit builder of the physical layer logic 1019 may encapsulate the frames with preambles to generate PPDUs for transmission via a physical layer device such as the transceivers (RX/TX) 1020 and 1040.

Figure 1C:
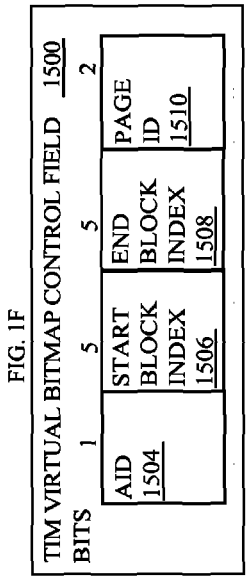
FIG. 1C depicts an embodiment of a management frame with a traffic indication map element for establishing communications between wireless communication devices.

The frame with the TIM element 1014 may comprise a frame such as the management frame 1200 in FIG. 1C. In particular, the frame with the TIM element 1014 may comprise a partial virtual bitmap based upon a hierarchical data structure such as the partial virtual bitmap 1700 illustrated in FIG. 1E and may identify each station within, e.g., one page, that has data buffered by an AP such as communications device 1010. For example, the AP may not arbitrarily transmit MSDUs to stations operating in a power saving (PS) mode, but may buffer the MSDUs and only transmit the MSDUs at designated times. Furthermore, the stations that currently have buffered MSDUs within the AP may be identified in frame comprising a TIM element, which may be included, e.g., as an element within beacon frames generated by the AP. Then, each station may determine that an MSDU is buffered for the station (such as communications device 1030) by receiving and interpreting the TIM element in the beacon frame. The station may interpret the TIM element by determining whether the page including their AID is included in the TIM element, determining whether the block index of their AIDs is included within the range of block indexes described in the element, determining whether the block with their AID is included in the TIM element, and, if, so, determining whether the TIM element indicates that the value associated with their AID indicates that data is being buffered at the AP. In a base service set (BSS) operating under a distributed coordination function (DCF), upon determining that an MSDU is currently buffered in the AP, a station operating in the PS mode may transmit a PS-Poll frame to the AP, which may respond with the corresponding buffered MSDU immediately, or acknowledge the PS-Poll and respond with the corresponding MSDU at a later time.

The communications devices 1010, 1030, 1050, and 1055 may each comprise a transceiver such as transceivers 1020 and 1040. Each transceiver 1020, 1040 comprises an RF transmitter and an RF receiver. Each RF transmitter impresses digital data onto an RF frequency for transmission of the data by electromagnetic radiation. An RF receiver receives electromagnetic energy at an RF frequency and extracts the digital data therefrom.

FIG. 1 may depict a number of different embodiments including a Multiple-Input, Multiple-Output (MIMO) system with, e.g., four spatial streams, and may depict degenerate systems in which one or more of the communications devices 1010, 1030, 1050, and 1055 comprise a receiver and/or a transmitter with a single antenna including a Single-Input, Single Output (SISO) system, a Single-Input, Multiple Output (SIMO) system, and a Multiple-Input, Single Output (MISO) system.

In many embodiments, transceivers 1020 and 1040 implement orthogonal frequency-division multiplexing (OFDM). OFDM is a method of encoding digital data on multiple carrier frequencies. OFDM is a frequency-division multiplexing scheme used as a digital multi-carrier modulation method. A large number of closely spaced orthogonal sub-carrier signals are used to carry data. The data is divided into several parallel data streams or channels, one for each sub-carrier. Each sub-carrier is modulated with a modulation scheme at a low symbol rate, maintaining total data rates similar to conventional single-carrier modulation schemes in the same bandwidth.

An OFDM system uses several carriers, or "tones," for functions including data, pilot, guard, and nulling. Data tones are used to transfer information between the transmitter and receiver via one of the channels. Pilot tones are used to maintain the channels, and may provide information about time/frequency and channel tracking. Guard tones may be inserted between symbols such as the short training field (STF) and long training field (LTF) symbols during transmission to avoid inter-symbol interference (ISI), which might result from multi-path distortion. These guard tones also help the signal conform to a spectral mask. The nulling of the direct component (DC) may be used to simplify direct conversion receiver designs.

In some embodiments, the communications device 1010 optionally comprises a Digital Beam Former (DBF) 1022, as indicated by the dashed lines. The DBF 1022 transforms information signals into signals to be applied to elements of an antenna array 1024. The antenna array 1024 is an array of individual, separately excitable antenna elements. The signals applied to the elements of the antenna array 1024 cause the antenna array 1024 to radiate one to four spatial channels. Each spatial channel so formed may carry information to one or more of the communications devices 1030, 1050, and 1055. Similarly, the communications device 1030 comprises a transceiver 1040 to receive and transmit signals from and to the communications device 1010. The transceiver 1040 may comprise an antenna array 1044 and, optionally, a DBF 1042.

FIG. 1A depicts an embodiment of a hierarchical data structure 1100 for traffic indication mapping. On the top level of the hierarchy, the traffic indication virtual map may be divided into four pages. Each page may support up to 2048 stations and, in several embodiments, each page may be transmitted as a separate TIM element. In some embodiments, multiple TIM elements may be transmitted in the same medium access control (MAC) service data unit (MSDU). In further embodiments, multiple MSDUs may be aggregated in each physical layer (PHY) protocol data units (PPDUs). In other embodiments, the hierarchical data structure 1100 may comprise more or less than four pages.

Each page may comprise up to 32 blocks and each of the 32 blocks may support up to 64 of the stations. Each block may comprise eight sub-blocks. Each sub-block may be one octet in length and may support eight of the stations associated with the corresponding block. In further embodiments, each block may comprise more or less than eight sub-blocks and each of the sub-blocks may be more or less than one octet in length.

Each bit of a sub-block may correspond to a different association identifier (AID) and thus, each bit may uniquely identify a station. In the present embodiment, the bit may be set to 1 if there is data buffered at the AP. Otherwise, the bit may be cleared to 0.

FIG. 1B depicts an embodiment of an association identifier structure 1150 for the hierarchical data structure illustrated in FIG. 1A. In the present embodiment, the AID comprises 13 bits. In other embodiments, the AID structure 1150 may comprise more or less than 13 bits.

In the present embodiment, the AID structure 1150 may comprise a page identifier (ID) having two bits (b12-b11), which is represented as "a" in the AID equation depicted below the AID structure 1150. The AID structure 1150 may comprise a page ID/block index extension having two bits (b10-b9), which is represented as "b" in the AID equation. The page ID/block index extension may facilitate a greater ratio of pages per block or blocks per page. The AID structure 1150 may comprise a block index having three bits (b8-b6), which is represented as "c" in the AID equation. The AID structure 1150 may comprise a sub-block index having three bits (b5-b3), which is represented as "d" in the AID equation. And, the AID structure 1150 may comprise a station bit position index having three bits (b2-b0), which is represented as "e" in the AID equation.

The AID equation may describe the calculation of a unique number per station based upon the hierarchical data structure illustrated in FIG. 1A. In particular, the AID unique number in this embodiment may be calculated by the following formula:

$$AID=((((\text{Page ID}\times 4+(\text{Page ID/Block index extension}-1))\times 8+(\text{Block index}-1))\times 8+(\text{Sub-block index}-1))\times 8+(\text{station bit position index})$$

To illustrate, if the variables are: the Page ID=0, the page ID/block index=1, the block index=2, the sub-block index=6. As a result, the equation becomes:

$$AID=((((0\times 4+(1-1))\times 8+(2-1))\times 8+(6-1))\times 8+(4)=108$$

FIG. 1C depicts an embodiment of a management frame 1200 for communications between wireless communication devices such as communications devices 1010, 1030, 1050, and 1055 in FIG. 1. The management frame 1200 may comprise a MAC header 1201, a frame body 1214, and a frame check sequence (FCS) field 1226. The MAC header 1201 may comprise the frame control field 1202 and other MAC header fields 1208. The frame control field 1202 may be two octets and may identify the type and subtype of the frame such as a management type and, e.g., a beacon frame subtype. The other MAC header fields 1208 may comprise, for example, one or more address fields, identification fields, control fields, or the like.

In some embodiments, the management frame 1200 may comprise a frame body 1214. The frame body 1214 may be a variable number of octets and may include data elements, control elements, or parameters and capabilities. In the present embodiment, the frame body 1214 comprises a traffic indication map (TIM) element 1220.

Figure 1D:
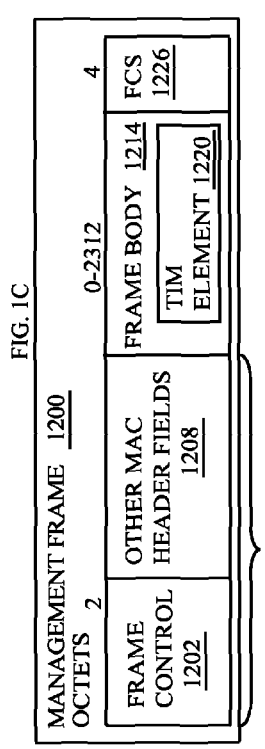
FIG. 1D depicts an embodiment of a traffic indication map element for establishing communications between wireless communication devices.

FIG. 1D illustrates an embodiment of a TIM element 1300. An access point (AP) may transmit the TIM element 1300 to inform stations such as low power sensors that the AP is buffering data for the station. In many embodiments, the station may then initiate communications with the AP to obtain the buffered data such as via a poll frame. In other embodiments, the AP may transmit the data to the station after transmitting the beacon.

The TIM element 1300 may comprise fields such as an element identifier (ID) field 1302, a length field 1306, a delivery TIM (DTIM) count field 1308, a DTIM period field 1310, a TIM virtual bitmap control field 1312, and partial virtual bitmap 1314. The element ID field 1302 may be one octet and may identify the element as a TIM element 1300. The length field 1306 may be one octet and may define the length of the TIM element 1300 or the length of a portion thereof. The DTIM count 1308 may be one octet and may indicate how many beacon frames (including the current frame) appear before the next DTIM frame. A DTIM Count field 1308 value of 0 may indicate that the current TIM frame is a DTIM frame. For instance, immediately after every DTIM (beacon frame with DTIM Count field 1308 of the TIM element 1300 equal to zero), the AP shall transmit all buffered, group-addressed frames. If the TIM indicating the buffered MSDU or aggregate MSDU (A-MSDU) is sent during a contention-free period (CFP), a contention-free (CF)-Pollable station operating in the power-savings (PS) mode does not send a power-saving (PS)-Poll frame, but remains active until the buffered MSDU or A-MSDU is received (or the CFP ends). If any station in its base service set (BSS) is in PS mode, the AP may buffer all group-addressed MSDUs and deliver them to all stations immediately following the next beacon frame containing a DTIM transmission.

The DTIM period field 1310 may be one octet and may indicate the number of beacon intervals between successive DTIMs. In many embodiments, if all TIM frames are DTIMs, the DTIM period field 1310 may have the value 1.

The TIM virtual bitmap control field 1312 may be one or two octets and may describe the content of the partial virtual bitmap 1314. For instance, the TIM virtual bitmap may include a bit such as bit 0 that contains a traffic indicator bit associated with AID 0 such as AID 1504 illustrated in FIG. 1F. This bit may be set to 1 in TIM elements 1300 with a value of 0 in the DTIM Count field 1308 when one or more group-addressed frames are buffered at the AP.

Figure 1E:
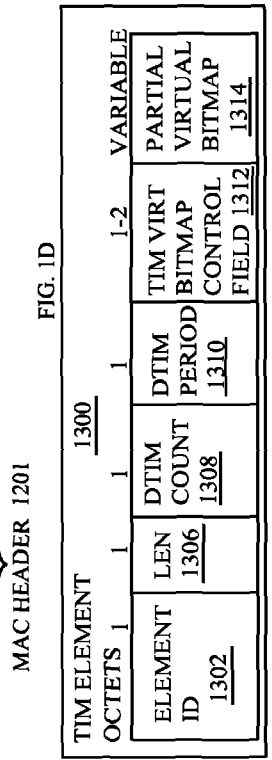
FIG. 1E depicts an embodiment of partial virtual bitmap based upon a hierarchical data structure for traffic indication mapping such as the hierarchical data structure illustrated in FIG. 1A.
Figure 1F:
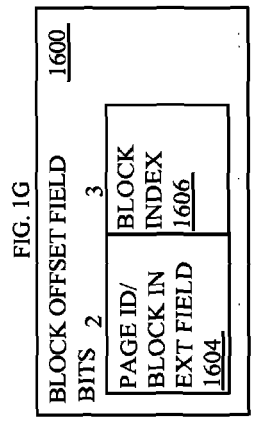
FIG. 1F depicts an embodiment of a traffic indication map, virtual bitmap control field such as the traffic indication map, virtual bitmap control field illustrated in FIG. 1D.

An embodiment of a TIM virtual partial bitmap control field 1500 is depicted in FIG. 1F. The TIM virtual partial bitmap control field 1500 may comprise the AID field 1504, a start block index field 1506, an end block index field 1508, and a page identifier (ID) field 1510. The start block index field 1506 may be 5 bits and may indicate a block index on the page included in the TIM element at which the partial virtual bitmap begins. In other words, the start block index field 1506 may provide an offset for the block indexes to indicate that all the block indexes prior to the start block index field 1506 value are not included in the TIM element. Some embodiments do not include the start block index and cover blocks from the first block through the block indicated by the end block index 1508. The end block index 1508 may be 5 bits and may indicate the last or end of the block indexes included in the TIM element within the page indicated by the TIM element.

The page ID field 1504 may be 2 bits in length and may indicate the page index of 0 through 3 (binary bits 00, 01, 10, and 11, respectively) to represent four pages. In some embodiments, the number of pages may be extended via the page ID/block index extension field 1604 to describe, e.g., eight or 16 pages rather than four pages.

Referring again to FIG. 1D, the partial virtual bitmap field 1314 may comprise bits describing stations for which data is buffered by the AP based upon a hierarchical data structure such as the hierarchical data structure illustrated in FIG. 1A. FIG. 1E depicts an embodiment of a partial virtual bitmap field 1700. The partial virtual bitmap 1700 may comprise multiple blocks 1720 such as block 1701. The block 1701 may comprise a block offset field 1702 and a block control field 1704. Depending upon the encoding of the block, the partial virtual bitmap 1700 may also include a block bitmap field 1708 and may also include a variable number of blocks from block 1 1710 to block N 1712.

Figure 1G:
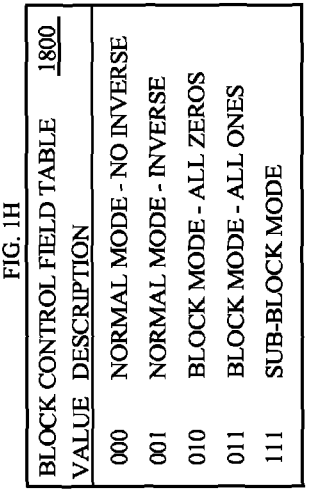
FIG. 1G depicts an embodiment of a block offset field such as the block offset field illustrated in FIG. 1E.

The block offset field 1702 may describe an offset for the block 1701 within the blocks 1720 in the partial virtual bitmap 1700. In the present embodiment, the block offset field 1702 locates the position of the Block 1701 in a page that is indicated in the page ID field 1510 in the TIM virtual bitmap control field 1500 in FIG. 1F. The block offset field 1702 may comprise a page ID/block index extension field 1604 and a block index field 1606 such as the block offset field 1600 illustrated in FIG. 1G according to one embodiment.

Figure 1H:
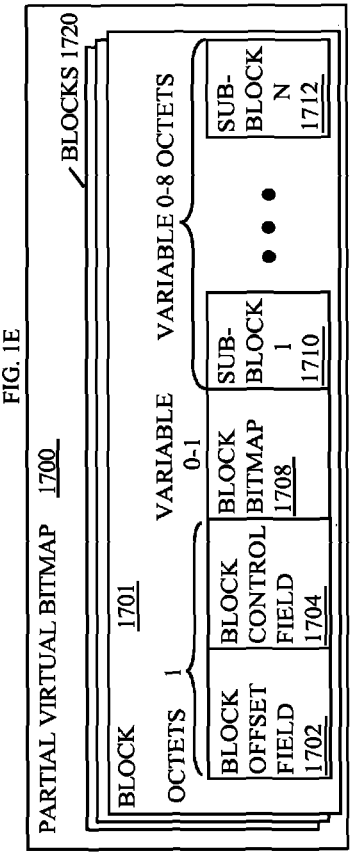
FIG. 1H depicts an embodiment of a block control field table with field values and descriptions for encoding schemes.

The block control field 1704 may control the encoding of the following block bitmap field 1708 and the sub-block bitmap fields, sub-block bitmap field 1 1710 through sub-block bitmap field N 1712. In some embodiments, the encodings may comprise one or more of the encodings described in the block control field table 1800 of FIG. 1H. Table 1800 may include normal mode encoding, block mode encoding, and sub-block mode encoding. The normal mode encoding or normal encoding may comprise a normal mode—no inverse encoding and a normal mode—inverse encoding. The normal mode—no inverse encoding represented by the bits "000" in the block control field 1704 may indicate that each bit in the sub-block bitmap fields (1710 through 1712) may represent station's AID. For example, the bit value 1 indicates there is data buffered at the AP and the bit value 0 indicates there is no data at the AP for the station.

The normal mode—inverse encoding represented by the bits "001" in the block control field 1704 may indicate the use of inverse encoding for the sub-block bitmap fields (1710 through 1712). So each bit in the sub-block bitmap fields (1710 through 1712) may represent station's AID. However, the bit value 0 indicates there is data buffered at the AP and the bit value 1 indicates there is no data at the AP for the station.

The block mode encoding or block encoding may comprise a block mode—all zeros encoding and a block mode— all ones encoding. The block encoding scheme may be used to indicate TIM information at the block level, i.e. indicating that this block 1701 is either all ones or all zeros. Therefore, the block length is 1 octet and the block bitmap field and the sub-block fields are not present.

The block mode—all zeros encoding represented by the bits "010" in the block control field 1704 may indicate the block 1701 comprises all zeros in every bit of the sub-block bitmaps within the block represented by block 1701, i.e. there is no data buffered at the AP. In this situation, no fields or bits beyond the block control field 1704 are included in the block 1701 because the receiving station can determine the value of the bit for the receiving station's AID by determining the value for the block 1701, i.e., zero.

The block mode—all ones encoding represented by the bits "011" in the block control field 1704 may indicate the block 1701 comprises all ones in every bit of the sub-block bitmaps within the block represented by block 1701, i.e. there is data buffered at the AP for all the stations associated with the block 1701. In this situation, no fields or bits beyond the block control field 1704 are included in the block 1701 because the receiving station can determine the value of the bit for the receiving station's AID by determining the value for the block 1701, i.e., one.

The sub-block mode encoding or sub-block encoding may be used to indicate TIM information in a sub-block level, i.e. indicating whether a particular sub-block of the block 1701 is all ones or all zeros. The sub-block mode encoding is represented by the bits "111" in the block control field 1704. Each bit of the block bitmap field 1708 represents each sub-block field 1710 through 1712. If a bit of the block bitmap field 1708 is set to 1, this indicates that there are data buffered at the AP for all the stations in the corresponding sub-block. If the bit of the block bitmap field 1708 is set to 0, this indicates that the AP does not have any data for the stations in the corresponding sub-block. Therefore, when the block 1701 is using this encoding scheme, the block length is 2 octets and the sub-block fields are not present because the receiving station can determine the value of the bit for the receiving station's AID by determining the value for the sub-block corresponding to the receiving station's AID.

In the present embodiment, the block bitmap field 1708, if present, is one octet in length. The block bitmap field 1708 may be present embodiment when the block 1701 is encoded with a normal mode or sub-block mode encoding, or the like. For normal mode operations, the block bitmap field 1708 may indicate which sub-blocks (1 through N) are present in the following sub-block fields 1710 through 1712. The m-th bit in the sub-block bitmap field 1708 indicates the m-th sub-block. If the m-th bit is set to 1, the m-th sub-block is present in the following sub-block fields 1710 through 1712. If the m-th bit is set to 0, the m-th sub-block is not present in the following sub-block fields 1710 through 1712. When the block 1701 is encoded in the block encoding scheme, the block bitmap field 1708 is not present.

When the block 1701 is encoded in the sub-block encoding scheme "111", each bit of the block bitmap field 1708 represents all the stations in the corresponding Sub-Block. There may be no sub-block fields following the block bitmap field 1708. For example, if the block bitmap field 1708 is "10100100", this indicates that all the stations in Sub-Block1, Sub-Block3, and Sub-Block6 have data buffered at the AP and all the other Sub-Blocks do not have any data buffered at the AP.

The sub-block fields 1710 through 1712, if present, may be variable in length (1 to 8 octets) depending on the value of the block control field 1704. Each bit corresponds to an AID of a station. If the p-th bit of a sub-block bitmap field 1710 is set to 1, it indicates that there is data buffered for the corresponding station. Using the hierarchy shown in FIG. 1A, the Sub-block1 bitmap [b0 . . . b7] is encoded as "00000010" by setting the 6-th bit to 1, indicating that there is data buffered at the AP for the station with AID equal to 6.

In many embodiments, one or more modes or encoding schemes such as the normal mode—inverse encoding for the block control field 1708 may implement an inversion process and indicate that values of bits for stations having buffered data at the AP have been inversed. In many such embodiments, the inversion process may increase the efficiency of the TIM element 1300 by reducing the amount of data to transmit to a receiving station to communicate the TIM element.

Referring again to FIG. 1C, in many embodiments, the management frame 1200 may comprise a frame check sequence (FCS) field 1226. The FCS field 1226 may be four octets and may include extra checksum characters added to the short frame 1060 for error detection and correction.

Note that the values shown in the FIGS. 1A-1H are for illustrative purposes and may be other values in other embodiments.

Figure 2:
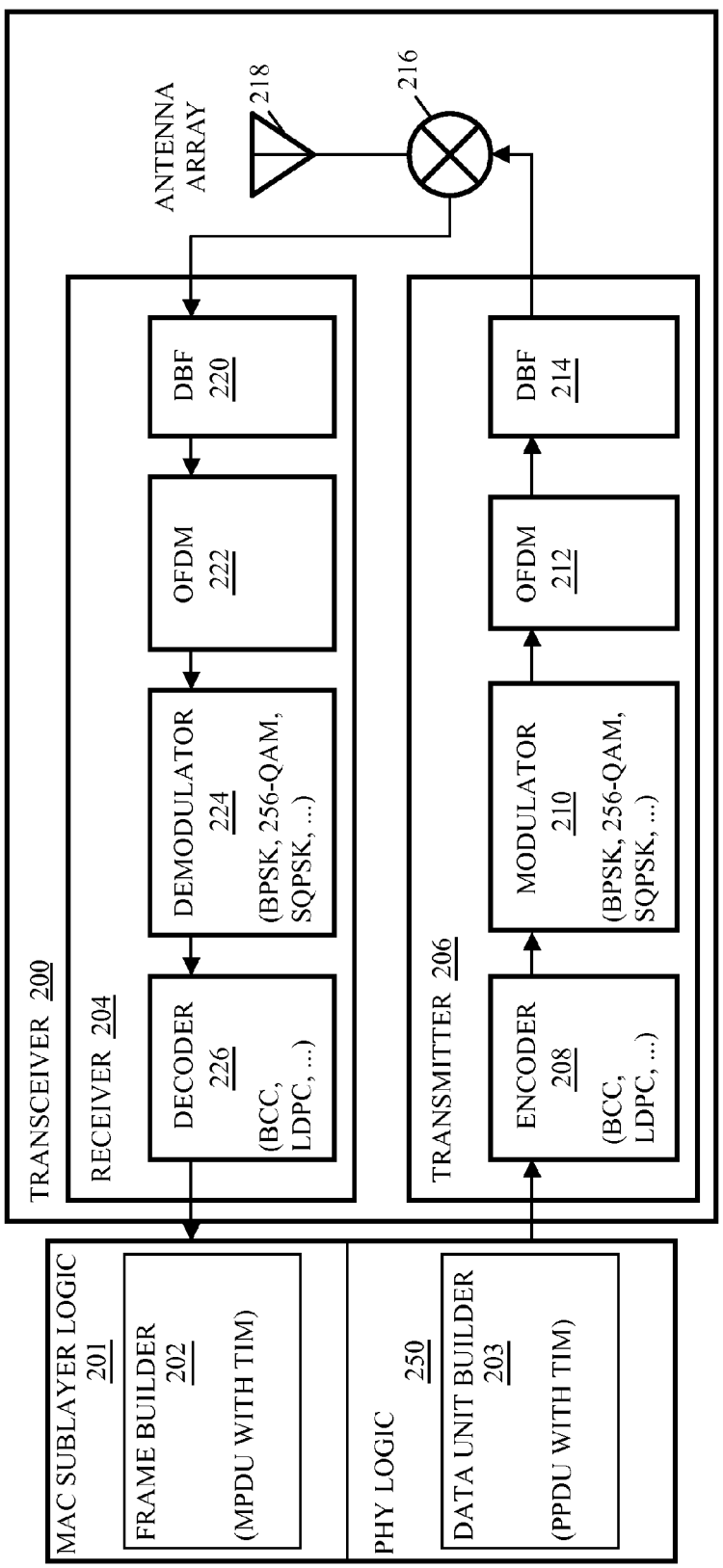
FIG. 2 depicts an embodiment of an apparatus to generate, transmit, receive and interpret a frame with a partial virtual bitmap based upon a hierarchical data structure for traffic indication mapping.

FIG. 2 depicts an embodiment of an apparatus to generate, transmit, receive, and interpret or decode a traffic indication map (TIM) element in a frame. The apparatus comprises a transceiver 200 coupled with Medium Access Control (MAC) sublayer logic 201 and a physical layer (PHY) logic 250. The MAC sublayer logic 201 may determine a frame and the physical layer (PHY) logic 250 may determine the PPDU by encapsulating the frame or multiple frames, MAC protocol data units (MPDUs), with a preamble to transmit via transceiver 200.

In many embodiments, the MAC sublayer logic 201 may comprise a frame builder 202 to generate frames such as one of the management frame 1200 with TIM elements 1220 or 1300 illustrated in FIGS. 1A-H. The TIM elements may comprise data indicative of MAC service data units (MPDUs) buffered or stored by an associated access point (AP) for particular stations associated with the AP. Association identifiers (AIDs) may identify the stations. The AP such as the communications device 1010 and a station such as the communications device 1030 in FIG. 1 may maintain some or part of the TIM elements 1220 or 1300 and values in memory such as the memory 1012 and 1032 illustrated in FIG. 1.

The PHY logic 250 may comprise a data unit builder 203. The data unit builder 203 may determine a preamble to encapsulate the MPDU or more than one MPDUs to generate a PPDU. In many embodiments, the data unit builder 203 may create the preamble based upon communications parameters chosen through interaction with a destination communications device.

The transceiver 200 comprises a receiver 204 and a transmitter 206. The transmitter 206 may comprise one or more of an encoder 208, a modulator 210, an OFDM 212, and a DBF 214. The encoder 208 of transmitter 206 receives and encodes data destined for transmission from the MAC sublayer logic 202 with, e.g., a binary convolutional coding (BCC), a low density parity check coding (LDPC), and/or the like. The modulator 210 may receive data from encoder 208 and may impress the received data blocks onto a sinusoid of a selected frequency via, e.g., mapping the data blocks into a corresponding set of discrete amplitudes of the sinusoid, or a set of discrete phases of the sinusoid, or a set of discrete frequency shifts relative to the frequency of the sinusoid. The output of modulator 210 is fed to an orthogonal frequency division multiplexer (OFDM) 212, which impresses the modulated data from modulator 210 onto a plurality of orthogonal sub-carriers. And, the output of the OFDM 212 may be fed to the digital beam former (DBF) 214 to form a plurality of spatial channels and steer each spatial channel independently to maximize the signal power transmitted to and received from each of a plurality of user terminals.

The transceiver 200 may also comprise diplexers 216 connected to antenna array 218. Thus, in this embodiment, a single antenna array is used for both transmission and reception. When transmitting, the signal passes through diplexers 216 and drives the antenna with the up-converted information-bearing signal. During transmission, the diplexers 216 prevent the signals to be transmitted from entering receiver 204. When receiving, information bearing signals received by the antenna array pass through diplexers 216 to deliver the signal from the antenna array to receiver 204. The diplexers 216 then prevent the received signals from entering transmitter 206. Thus, diplexers 216 operate as switches to alternately connect the antenna array elements to the receiver 204 and the transmitter 206.

The antenna array 218 radiates the information bearing signals into a time-varying, spatial distribution of electromagnetic energy that can be received by an antenna of a receiver. The receiver can then extract the information of the received signal.

The transceiver 200 may comprise a receiver 204 for receiving, demodulating, and decoding information bearing signals. The receiver 204 may comprise one or more of a DBF 220, an OFDM 222, a demodulator 224 and a decoder 226. The received signals are fed from antenna elements 218 to a Digital Beam Former (DBF) 220. The DBF 220 transforms N antenna signals into L information signals. The output of the DBF 220 is fed to the OFDM 222. The OFDM 222 extracts signal information from the plurality of sub-carriers onto which information-bearing signals are modulated. The demodulator 224 demodulates the received signal, extracting information content from the received signal to produce an un-demodulated information signal. And, the decoder 226 decodes the received data from the demodulator 224 and transmits the decoded information, the MPDU or more than one MPDUs, to the MAC sublayer logic 201.

Persons of skill in the art will recognize that a transceiver may comprise numerous additional functions not shown in FIG. 2 and that the receiver 204 and transmitter 206 can be distinct devices rather than being packaged as one transceiver. For instance, embodiments of a transceiver may comprise a Dynamic Random Access Memory (DRAM), a reference oscillator, filtering circuitry, synchronization circuitry, an interleaver and a deinterleaver, possibly multiple frequency conversion stages and multiple amplification stages, etc. Further, some of the functions shown in FIG. 2 may be integrated. For example, digital beam forming may be integrated with orthogonal frequency division multiplexing.

The MAC sublayer logic 201 may decode or parse the MPDU or MPDUs to determine the particular type of frame or frames and identify one or more TIM elements included in the MPDU(s). For each TIM element, the MAC sublayer logic 201 may parse the TIM element to determine the page ID from the TIM element. If the page ID matches the page ID for the MAC sublayer logic 201 then the TIM element may comprise data related to the receiving station associated with the MAC sublayer logic 201. The MAC sublayer logic 201 may parse the TIM element to determine the page ID/block index extension, the block, the sub-block, if present, and the station within the sub-block, if present, that is associated with the AID for the receiving station from the TIM element. If a bit associated with the receiving station is not present or is a logical zero, then the receiving station may not have data buffered at the AP. On the other hand, if the bit associated with the receiving station is present and is a logical one, the receiving station may have data buffered at the AP.

In other embodiments, if an inverse encoding for a block is set in the TIM element, the sub-blocks may refer to sub-blocks that do not have data buffered, or the bits associated with the AID of the receiving station may comprise a logical zero to indicate that data is buffered for the receiving station at the AP and a logical one to indicate that data is not buffered at the AP.

Figure 3:
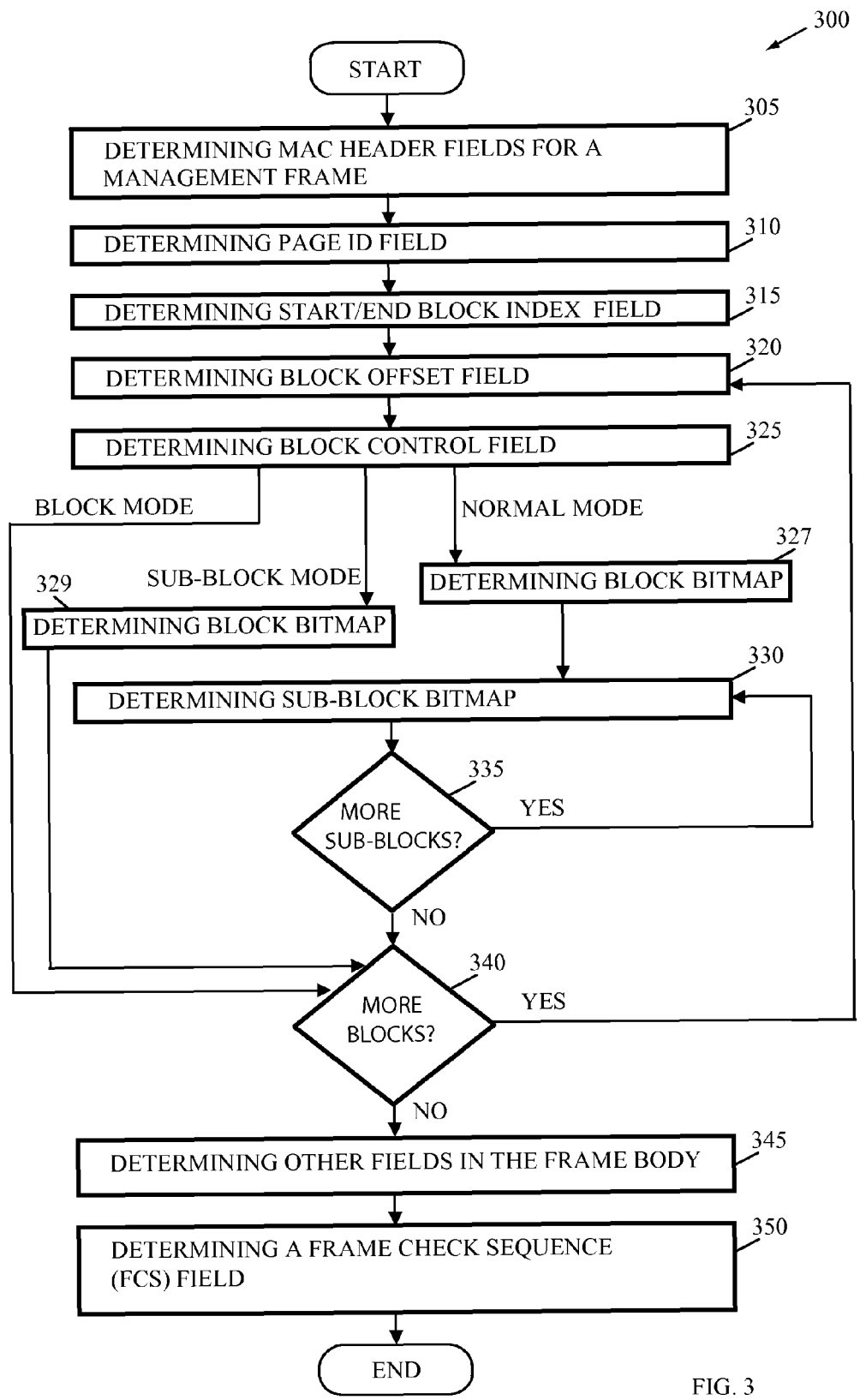
FIG. 3 depicts an embodiment of a flowchart to generate a frame with a partial virtual bitmap based upon a hierarchical data structure for traffic indication mapping.

FIG. 3 depicts an embodiment of a flowchart 300 to generate or otherwise determine a management frame with a TIM element such as the TIM elements described in conjunction with FIGS. 1-2. The flowchart 300 begins with a medium access control (MAC) sublayer logic determining a MAC header for a management frame (element 305).

The MAC sublayer logic may thereafter determine the TIM element for the frame body. Determining the TIM element may comprise determining a page identifier field to identify the page of association identifiers (AIDs) for which the TIM element comprises information about data buffered for stations (element 310). For instance, the MAC sublayer logic may access memory to retrieve an element structure for the TIM elements and assign the elements values such as a logical one to indicate that devices have data buffered at the access point (AP) within which the MAC sublayer logic resides.

The MAC sublayer logic may determine a start and/or end block index field(s) (element 315). The start and/or end block index field(s) may identify a range of block indexes or AIDs that are included in the TIM element so the MAC sublayer logic may determine whether to continue to decode the TIM element to determine if the AP buffers data for the MAC sublayer logic.

The MAC sublayer logic may determine a block offset field (element 320) of a block in the partial virtual bitmap. The block offset field may be present in each of the blocks that indicate that the AP buffers data for associated stations. The MAC sublayer logic may decode the block offset value to determine whether the block is associated with the AID of MAC sublayer logic.

The MAC sublayer logic may determine a block control field (element 325). The block control field may be present for each of the blocks to indicate an encoding scheme for the block. For instance, the encoding scheme may include block mode encoding if the values in the block are all the same such as all logical ones or all logical zeros. In the block mode, if the MAC sublayer logic did not decode the appropriate block yet to determine whether data is buffered at the AP, the flowchart 300 continues to determine whether additional blocks are available to decode after decoding the block control field (element 340).

The encoding scheme may include normal mode encoding wherein the block bitmap field comprises bits to indicate sub-blocks that are included in the block. In the normal mode, if the MAC sublayer logic did not decode the appropriate block yet to determine whether data is buffered at the AP, the flowchart 300 continues to determine the block bitmap 329 to determine which sub-blocks are present and, if the sub-block comprising the AID for the MAC sublayer logic is included in the block, the MAC sublayer logic continues by determining the content of the sub-block bitmaps until the MAC sublayer logic determines whether the AP is buffering data for the MAC sublayer logic. Otherwise, the MAC sublayer logic determines whether there are additional blocks (element 340) and, if so, the flowchart 300 continues with determining the value in block offset field (element 320) of the next block.

Or, the encoding scheme may include a sub-block mode encoding wherein the block bitmap is included to indicate which sub-blocks indicate that the AP is buffering data for all the stations associated with the sub-block via their AID and which sub-blocks indicate that AP is not buffering data for any of the stations associated with the sub-block via their AID. In the sub-block mode, if the MAC sublayer logic did not decode the appropriate block yet to determine whether data is buffered at the AP, the flowchart 300 continues to determine the block bitmap 327 to determine which sub-blocks are include all zeros and which sub-blocks contain all ones and, if the sub-block comprising the AID for the MAC sublayer logic is included in the block, the MAC sublayer logic continues by determining the content of the sub-blocks via bits in the block bitmap until the MAC sublayer logic determines whether the AP is buffering data for the MAC sublayer logic. Otherwise, the MAC sublayer logic determines whether there are additional blocks (element 340) and, if so, the flowchart 300 continues with determining the value in block offset field (element 320) of the next block.

Otherwise, the MAC sublayer logic may determine other elements of the management frame body frame (element 345). In many embodiments, determining the fields may comprise retrieving these fields from a storage medium for inclusion in a frame. In other embodiments, the values to include in such fields may be stored in a storage medium such as a read only memory, random access memory, a cache, a buffer, a register, or the like. In further embodiments, one or more of the fields may be hardcoded into the MAC sublayer logic, PHY logic, or may otherwise be available for insertion into a frame. In still other embodiments, the MAC sublayer logic may generate the values of the fields based upon access to indications of the values for each.

After determining the other portions of the frame, the MAC sublayer logic may determine a frame check sequence (FCS) field value (element 350) to provide for error corrections in bit sequences received by the receiving device.

Figure 4A:
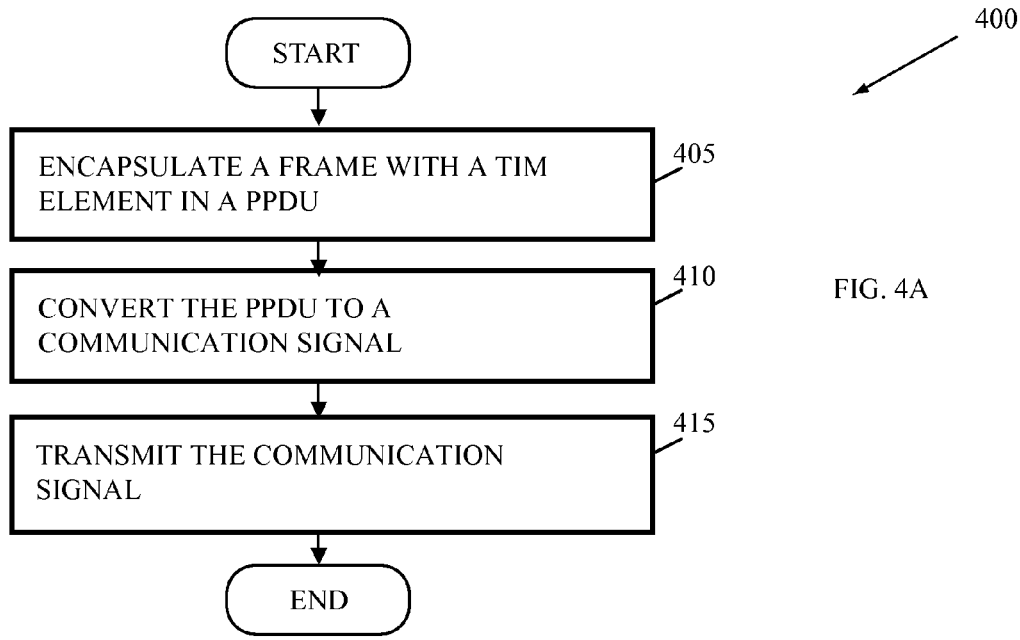
FIGS. 4A-B depict embodiments of flowcharts to transmit, receive, and interpret communications with frames having partial virtual bitmaps based upon a hierarchical data structure for traffic indication mapping as illustrated in FIG. 2.
Figure 4B:
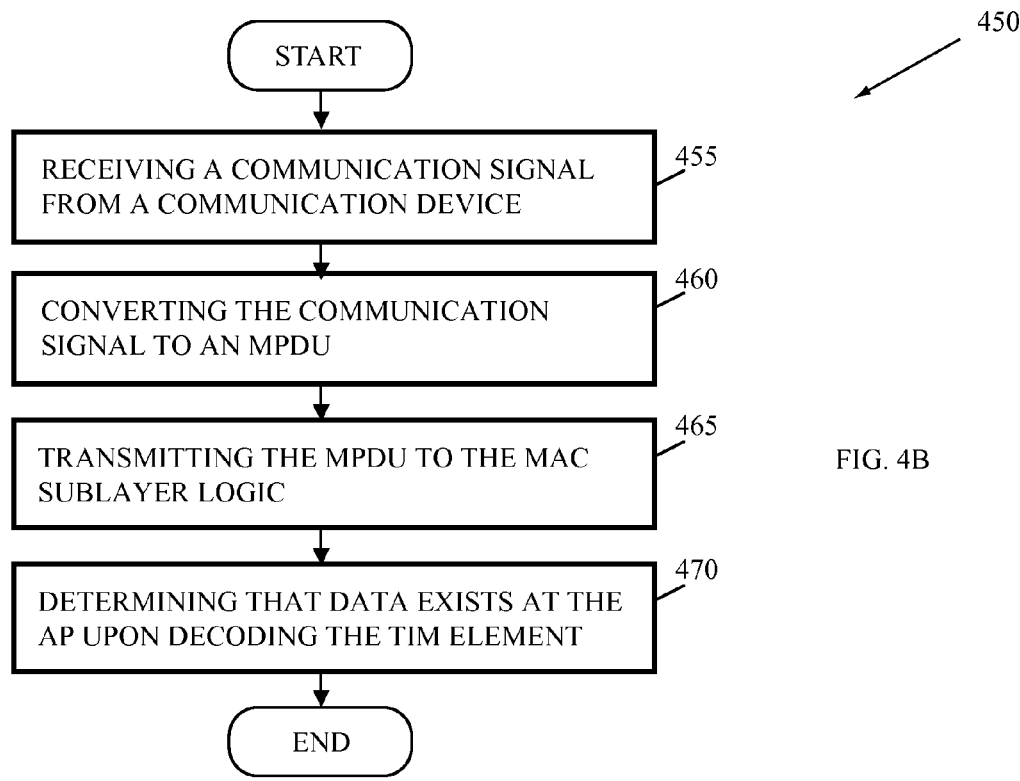

FIGS. 4A-B depict embodiments of flowcharts 400 and 450 to transmit, receive, and interpret or decode communications with a management frame with a TIM element such as the TIM elements illustrated in FIGS. 1A-H. Referring to FIG. 4A, the flowchart 400 may begin with receiving a frame from the frame builder comprising one or more TIM elements. The MAC sublayer logic of the communications device may generate the frame as a management frame to transmit to a station and may pass the frame as an MPDU to a data unit builder that transforms the data into a packet that can be transmitted to a station. The data unit builder may generate a preamble to encapsulate one or more of the MPDUs from the frame builder to form a PPDU for transmission (element 405).

The PPDU may then be transmitted to the physical layer device such as the transmitter 206 in FIG. 2 or the transceiver 1020,1040 in FIG. 1 so the PPDU may be converted to a communication signal (element 410). The transmitter may then transmit the communication signal via the antenna (element 415).

Referring to FIG. 4B, the flowchart 450 begins with a receiver of a station such as the receiver 204 in FIG. 2 receiving a communication signal via one or more antenna(s) such as an antenna element of antenna array 218 (element 455). The receiver may convert the communication signal into one or more MPDUs in accordance with the process described in the preamble (element 460). More specifically, the received signal is fed from the one or more antennas to a DBF such as the DBF 220. The DBF transforms the antenna signals into information signals. The output of the DBF is fed to OFDM such as the OFDM 222. The OFDM extracts signal information from the plurality of subcarriers onto which information-bearing signals are modulated. Then, the demodulator such as the demodulator 224 demodulates the signal information via, e.g., BPSK, 16-QAM, 64-QAM, 256-QAM, QPSK, or SQPSK. And the decoder such as the decoder 226 decodes the signal information from the demodulator via, e.g., BCC or LDPC, to extract the one or more MPDUs (element 460) and transmits the one or more MPDUs to MAC sublayer logic such as MAC sublayer logic 202 (element 465).

The MAC sublayer logic may decode the TIM element in each of the MPDUs. For instance, the MAC sublayer logic may parse the TIM element to determine the value of the page ID field, one or more block offset fields, a block control field for one or more blocks, possibly a block bitmap field, and possibly the sub-block bitmap fields for one or more sub-block bitmaps to determine whether the bit associated with the AID for the receiving station indicates that the AP is buffering data for the station (element 470). In some embodiments, the MAC sublayer logic may determine whether the other fields in the TIM element(s) indicate that the data will be broadcast to a group of devices after receipt of the beacon comprising the TIM element, or if the AP will await a frame from the station instructing the AP to send the frame.

Figure 5:
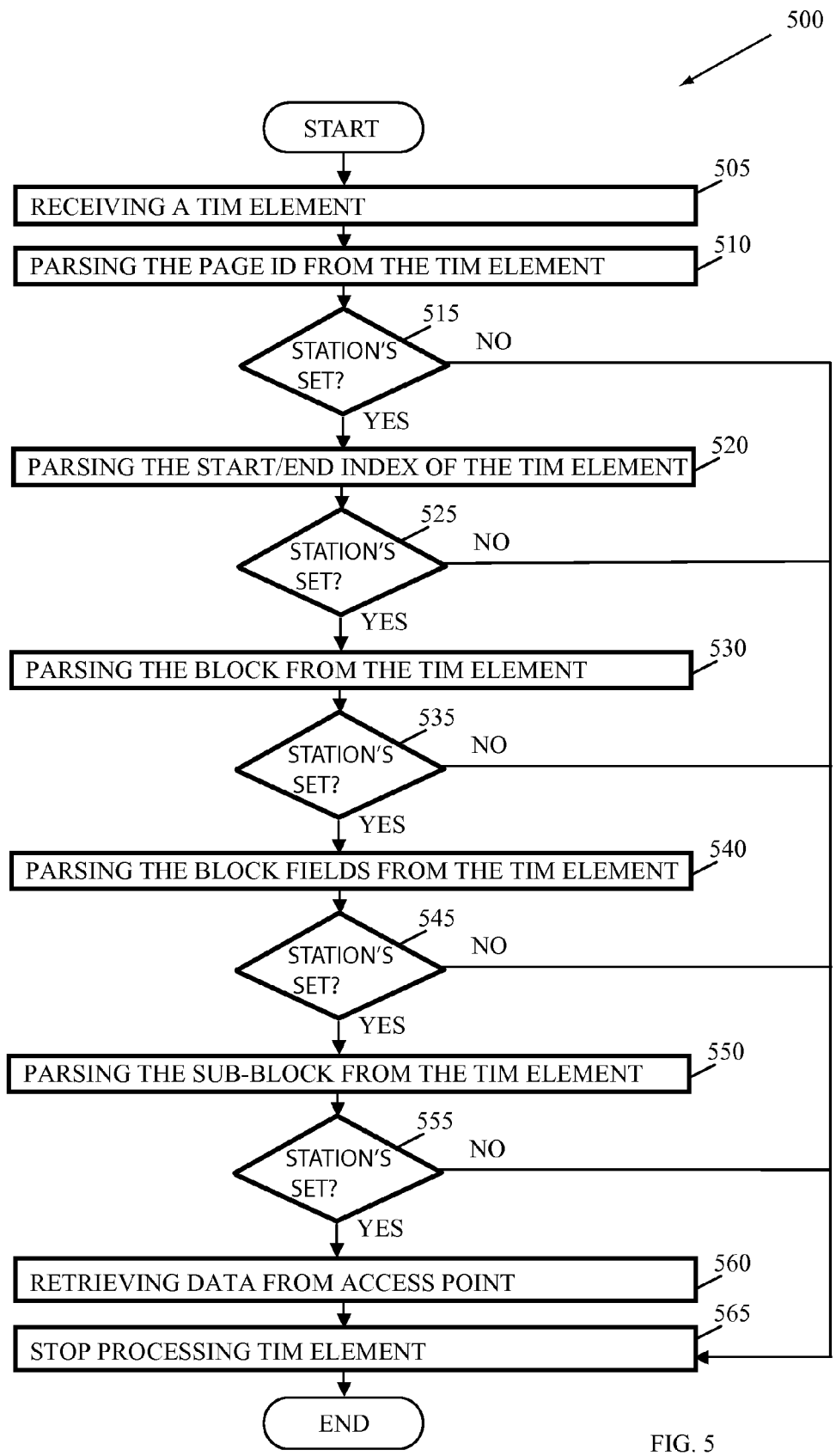
FIG. 5 depicts an embodiment of a flowchart to decode a frame with a partial virtual bitmap based upon a hierarchical data structure for traffic indication mapping.

FIG. 5 depicts an embodiment of a flowchart 500 for a receiving station to decode or otherwise determine information from a management frame with a TIM element such as the TIM elements described in conjunction with FIGS. 1-4. The flowchart 500 begins with a medium access control (MAC) sublayer logic receiving the TIM element (element 505). The MAC sublayer logic may parse the TIM element to determine a page identifier to identify the page of association identifiers (AIDs) for which the TIM element comprises information about data buffered for stations (element 510). For instance, the MAC sublayer logic may access memory to retrieve an association identifier (AID) assigned to the receiving station by the AP and parse the AID to determine the page ID associated with the receiving station. If the page ID does not match the page ID determined from the TIM element (element 515), then the receiving station may stop processing the TIM element (element 565).

If the page ID does match, the MAC sublayer logic may parse the TIM element to determine the start and/or end block indexes included in the TIM element to identify whether the AID of the MAC sublayer logic falls within the range of block indexes included in the TIM element (element 520). If the block index associated with the receiving station does not match the range of indexes determined from the TIM element (element 525), then the receiving station may stop processing the TIM element (element 565).

If the start and/or end block indexes associated with the receiving station does match, the MAC sublayer logic may parse the TIM element to determine the one or more blocks included in the TIM element to identify the blocks of AIDs for which the TIM element comprises information about data buffered for stations (element 530). If the block associated with the receiving station does not match the blocks determined from the TIM element (element 535), then the receiving station may stop processing the TIM element (element 565).

If the block associated with the receiving station does match, the MAC sublayer logic may parse the TIM element to determine the one or more block fields included in the TIM element to identify the blocks of AIDs for which the TIM element comprises information about data buffered for stations (element 540). If the block associated with the receiving station does not fall within the blocks identified in the block fields determined from the TIM element (element 545), then the receiving station may stop processing the TIM element (element 565).

In some embodiments, the block fields may define an inversion encoding process that inverses the indication of sub-blocks included in the TIM element. If the inversion encoding is set for the block, then the MAC sublayer logic may determine whether the block within which the receiving stations AID resides is not included to determine whether the AP is buffering data for the receiving station. In such embodiments, if the block is not included, the receiving station may retrieve the data from the access point (element 560).

Otherwise, depending on the encoding scheme, the MAC sublayer logic may parse the TIM element to determine the one or more sub-blocks included in the TIM element to identify the sub-blocks of AIDs for which the TIM element comprises information about data buffered for stations (element 530). If the sub-block associated with the receiving station does not fall within the sub-blocks identified in the sub-blocks determined from the TIM element (element 555), then the receiving station may stop processing the TIM element (element 565).

If the sub-block associated with the receiving station does fall within the sub-blocks identified in the sub-blocks determined from the TIM element (element 555) or the MAC sublayer logic determined whether the AP is buffering data for the receiving station from a block level or block bitmap field, then the receiving station may retrieve the data from the access point (element 560).

Another embodiment is implemented as a program product for implementing systems and methods described with reference to FIGS. 1-5. Some embodiments can take the form of an entirely hardware embodiment, an entirely software embodiment, or an embodiment containing both hardware and software elements. One embodiment is implemented in software, which includes but is not limited to firmware, resident software, microcode, etc.

Furthermore, embodiments can take the form of a computer program product (or machine-accessible product) accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid-state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

The logic as described above may be part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product.

It will be apparent to those skilled in the art having the benefit of this disclosure that the present disclosure contemplates methods and arrangements for traffic indication mapping for wireless communications. It is understood that the form of the embodiments shown and described in the detailed description and the drawings are to be taken merely as examples. It is intended that the following claims be interpreted broadly to embrace all variations of the example embodiments disclosed.

What is claimed is:

1. An apparatus for an access point (AP), the apparatus comprising:
    memory configured to store a traffic indication virtual bitmap, the traffic indication virtual bitmap having a hierarchical structure including a plurality of pages, a page of the plurality of pages including a plurality of blocks; and
    processing circuitry to:
    encode a physical layer protocol data unit (PPDU), the PPDU including a traffic indication map (TIM) element,
    the TIM element having a Partial Virtual Bitmap field, the Partial Virtual Bitmap field having one or more encoded block fields, an encoded block field having a block control field for indicating an encoding mode for a corresponding encoded block,
    a portion of a page of the traffic indication virtual bitmap being encoded in the Partial Virtual Bitmap field of the TIM element; and
    cause to be transmitted a beacon frame that includes the TIM element, a bit in the portion of the page in the traffic indication virtual bitmap indicating whether the AP has data buffered for a specific station (STA).

2. The apparatus of claim 1, wherein the TIM element includes a bitmap control field that includes a page index to indicate which page of the traffic indication virtual bitmap is encoded in the Partial Virtual Bitmap field of the TIM element.

3. The apparatus of claim 1, wherein the block control field includes a bit indicating whether each bit value of the respective block of the bitmap is inverted.

4. The apparatus of claim 2, wherein a block of the plurality of blocks includes a plurality of sub-blocks.

5. The apparatus of claim 1, wherein the Partial Virtual Bitmap field includes a concatenation of encoded block subfields that contain association identifiers (AIDs).

6. The apparatus of claim 1, further comprising:
transceiver circuitry to transmit the beacon frame including the TIM element, and one or more antennas coupled to the transceiver circuitry.

7. An apparatus for a station (STA), the apparatus comprising:
receiver circuitry to receive, from a second apparatus, a beacon frame including a traffic indication map (TIM) element, the TIM element having a block control field to indicate an encoding mode for a corresponding encoded block of a traffic indication virtual bitmap, a portion of a page of the bitmap encoded in a Partial Virtual Bitmap field of the TIM element, wherein the bitmap has a hierarchical structure including a plurality of pages, a page of the plurality of pages including a plurality of blocks, wherein the STA is assigned to a block of the plurality of blocks; and
processing circuitry to decode the TIM element to determine whether the TIM element includes the portion of the page of the bitmap to which the STA is assigned, wherein the processing circuitry is configured to decode a bitmap control field of the TIM element to determine whether the TIM element includes the portion of the page of the bitmap to which the STA is assigned, and wherein the block control field includes a bit indicating that each value of the respective block of the bitmap is inverted, and wherein a block of the plurality of blocks includes a plurality of sub-blocks.

8. The apparatus of claim 7, wherein the processing circuitry is configured to decode the TIM element based on an association identifier (AID) of the apparatus.

9. The apparatus of claim 7, wherein the STA is configured for Bluetooth communication.

10. A non-transitory computer readable medium to store instructions executed by an access point (AP) to:
encode a physical layer protocol data unit (PPDU) the PPDU including a traffic indication map (TIM) element, the TIM element having a block control field to indicate an encoding mode for a corresponding encoded block of a traffic indication virtual bitmap, a portion of a page of the bitmap encoded in a Partial Virtual Bitmap field of the TIM element;
store the traffic indication virtual bitmap, the traffic indication virtual bitmap having a hierarchical structure including a plurality of pages, a page of the plurality of pages including a plurality of blocks, the TIM element including a bitmap control field that includes a page index to indicate which page of the traffic indication virtual bitmap is encoded in the Partial Virtual Bitmap field of the TIM element; and
configure a beacon frame for transmission, the beacon frame including the TIM element, a bit in the portion of the traffic indication virtual bitmap indicating whether the AP has data buffered for a specific station (STA), wherein the block control field includes a bit indicating that each bit value of the respective block of the bitmap is inverted, and wherein a block of the plurality of blocks includes a plurality of sub-blocks.

11. The non-transitory computer-readable medium of claim 10, wherein a block of the plurality of blocks includes a plurality of sub-blocks.

12. The non-transitory computer-readable medium of claim 10, wherein the Partial Virtual Bitmap field includes a concatenation of encoded block subfields that contain association identifiers (AIDs).

13. The non-transitory computer-readable medium of claim 10, further storing instructions to:
transmit the beacon frame including the TIM element.

14. A non-transitory computer readable medium to store instructions executed by a station (STA) to:
receive a beacon frame including a traffic indication map (TIM) element, the TIM element having a block control field to indicate an encoding mode for a corresponding encoded block of a traffic indication virtual bitmap, a portion of a page of the bitmap encoded in a Partial Virtual Bitmap field of the TIM element, wherein the bitmap has a hierarchical structure including a plurality of pages, a page of the plurality of pages including a plurality of blocks, wherein the STA is assigned to a block of the plurality of blocks, and wherein the processing circuitry is configured to decode a bitmap control field of the TIM element to determine whether the TIM element includes the portion of the page of the bitmap to which the STA is assigned, and
decode the TIM element to determine whether the TIM element includes the portion of the page of the bitmap to which the STA is assigned, wherein the block control field includes a bit indicating that each bit value of the respective block of the bitmap is inverted, and wherein a block of the plurality of blocks includes a plurality of sub-blocks.

15. The non-transitory computer-readable medium of claim 14, further storing instructions to:
decode the TIM element based on an association identifier (AID) oft STA.

* * * * *

UNITED STATES PATENT AND TRADEMARK OFFICE
CERTIFICATE OF CORRECTION

PATENT NO. : 9,888,407 B2  
APPLICATION NO. : 13/977706  
DATED : February 6, 2018  
INVENTOR(S) : Park et al.

Page 1 of 1

It is certified that error appears in the above-identified patent and that said Letters Patent is hereby corrected as shown below:

On the Title Page

On page 2, in Column 2, item (56) under "Other Publications", Line 20, delete "Apr. 24, 2017"," and insert --Apr. 25, 2017",-- therefor In the Claims In Column 20, Line 54, in Claim 15, delete "oft" and insert --of the-- therefor Signed and Sealed this  
Thirtieth Day of July, 2019

Andrei Iancu  
*Director of the United States Patent and Trademark Office*